Patented July 23, 1935

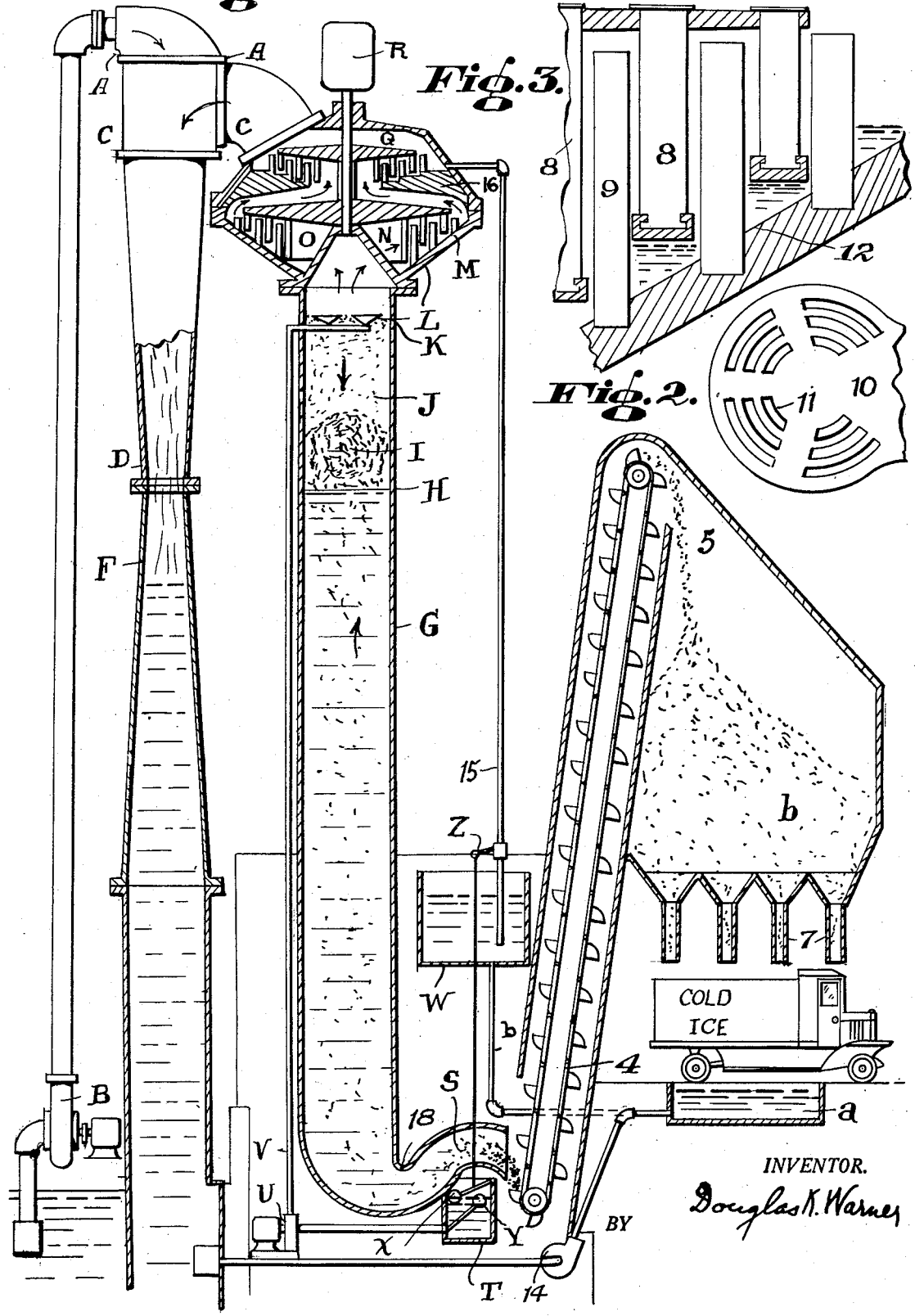

2,009,283

UNITED STATES PATENT OFFICE 2,009,283

ART OF UNIFORMLY FREEZING SOLUTIONS IN VACUUM

Douglas Kent Warner, Bristol, Conn.

Application January 21, 1930, Serial No. 422,245

4 Claims. (Cl. 62—172)

Fig. 1 represents a complete brine freezing plant in which the brine is frozen into a slush form by spraying it directly into a high vacuum the water vapor being carried off by a centrifugal compressor and condensed between falling sheets of water in a new type of atmospheric condenser. The finely divided frozen brine slush mixed with liquid brine, drops thru the standpipe G, out a trap at the bottom, and out into atmospheric pressure for use.

Fig. 2 represents a section of the condenser water sheets at the line C—C, showing the access of water vapor to said sheets.

Fig. 3 shows the compressor blades and method of cooling same and the multistage precooling of the makeup brine.

Referring to Fig. 1; B represents a pump drawing sea water up to plate A—A at top of condenser. This plate is cut with broken circular slots permitting sheets of water 11 Fig. 2 to drop down. Water vapor and air enter between these sheets and as the sheets drop they are brought together in a single stream of very rapidly moving water. The steam is thereby compressed and condensed between the sheets and the air is entrained and carried out thru F. The water then runs into a large shallow pond where natural evaporation increases the density to a point where it contains about 20% more water than required for the product involved. Thus if an 18 degree F. temp. is desired the sea water is evaporated until it contains about 8% salt by weight and the evaporation during freezing will increase the concentration during freezing to about 10%. If a 5 deg. temp. is required the water is further dried or salt added until the density is about 1.12 or 16% salt which will result in a finished product of 20% salt by weight giving a constant 5 deg. temperature. Thus if a 5 deg. temperature is required in California; sea water containing 3% salt must be spread over a pond one inch deep and allowed to stand 4 or 5 days until it is only $\frac{3}{16}$ of an inch deep when it may be run into the compressor. If an 18 deg. temperature will suffice it may be withdrawn when ⅜ of an inch deep at the end of 3 to 4 days, and twice as much brine slush will be obtained at each withdrawal.

If the melted brine is returned to the plant after use with a loss in handling of not much over 20% the sea water may be used for make-up without any drying process preliminary thereto. For most purposes on shore the melted brine would be returned to the plant as the most convenient place to dispose of it, but a fishing fleet would leave port loaded down with frozen brine and return with a slightly lighter load of frozen fish with the melted brine all pumped overboard. The fish could be thrown on the slush the minute they were caught, and the heat transfer to the drained frozen brine is so rapid that they can be frozen faster with an 18 deg. frozen brine than if placed in a pan in liquid brine 18 deg. below zero. The reason for this is that the fish melts a pocket just its shape in the frozen brine so that it comes in actual contact with the ice on all of one side. The brine runs away as fast as it melts so that it does not soak into the fish as it does when freezing the fish in cold liquid brine. After the fish are frozen they are stowed in a dry compartment beneath the frozen brine and refrigerated by it. Meat and other products may be frozen rapidly in like manner because as long as the salt water drains away as quickly as it forms it can not enter the product as it would where brine in close contact with the food, warmed up a trifle from the heat of the meat, could soak back in the still unfrozen product.

In Fig. 1 number 4 shows a conveyor carrying the frozen product to an overhead bunker for loading directly into dump trucks or delivery pails in the trucks or to bunkers of refrigerator trucks. Below the trucks a sump (a) receives the melted returned brine and the makeup ocean brine from pump 14. From (a) the brine is pumped to storage W, and from here the atmospheric pressure forces it up thru float controlled valve Z and pipe 15 to the top and last stage of the centrifugal compressor L. The compressor is built with two rotors each mounting several sets of blades each comprising one compression stage, each set of rotor blades (8) being separated from the next by a stationary set of blades (9) which reverse the motion of the steam thereby compressing it. The top set of stationary blades are set on the removable ring 16 and the lower set in the lower casing wall. The make-up brine from pipe 15 as it passes down over the ring 16 is dammed up by the rings of stationary blades to form rings of brine in contact with the blades. The total increase in pressure thru all stages of compression amounts to only about ¼ lb. per sq. in. or about 6 in. total height of water. At its final pressure the steam is still less dense lighter or rarer than the steam leaving the last stages of the most economical and largest steam turbine.

It will be readily seen that the velocity energy of this steam leaving the turbine blades could not stop the downward flow of brine or water of about 100,000 times the density. Large quantities of water vapor leave the fluid as it passes between stages thru the stationary blades as it both cools itself and absorbs the heat of compression and friction, from the blades by cooling them thru evaporation. The brine in each ring cools itself by evaporation to the temperature corresponding to the boiling point at the pressure of each stage. The entrained air in the make-up brine passes directly to the condenser without adding to the load of the compressor as it would if introduced directly. Also the make-up brine is cooled by stages, thus greatly reducing the work of cooling. Also the vapor is compressed almost isothermally due to the recooling at every set of stationary blades and so much more power is saved. The brine drops from ring 16 onto plate P which carries it back over the lower compressor rotor and sprinkles it thru the steam to the lower casing, where it passes thru the lower sets of blades and on down the inside walls of pipe G.

This together with some of the brine which was not frozen in the mist of the spray nozzles, K and J, and soaks into the pile of frozen beads of brine I at the top of solution at H. The weight of the solution causes the whole to move slowly down and out against atmospheric pressure thru the trap 18. The liquid brine passes thru a screen S into tank T being carried down in small filled pipes to keep it out of contact with the air to prevent much reabsorption. The frozen brine passes out over the discharge lip and onto conveyor 4. Pump U takes a constant stream of salt water from tank T and throws it thru pipe V and out nozzles K.

When most of the spray freezes there will be a shortage of brine at S and the float ball X will drop opening valve Z and causing more make-up water to run in pipe 15. If the level in T drops too suddenly float ball Y will drop, closing the water to the pump U and shutting off sprays until enough make-up water has been supplied. It will be noted that the ice formed is a uniform homogeneous mass at a temperature above the cryohydrate a new product for which Letters Patent were applied for Nov. 9, 1927. A sulphuric acid absorber similar to the condenser may replace compressor.

I claim:

1. A method of uniformly freezing a water solution with and without emulsions and containing more water than that of the cryohydrate solution consisting of spraying the weak solution into a high vacuum vessel, and rapidly removing the vapors of evaporation at such a rate as to produce almost instantaneous freezing of the remaining solution.

2. A method of uniformly freezing a liquid containing solids in solution and emulsion containing more water than that corresponding to the cryohydrates of the solutes consisting of spraying said solution into a partially evacuated vessel to produce evaporation by removal of heat of fusion of said liquid, and removing the vapors resulting from said evaporation at such a rate that the liquid is frozen in small particles containing uniform proportions of the constituents of said solution.

3. A method of manufacturing ice consisting of spraying water into a high vacuum chamber, rapidly removing the vapors of evaporation to produce ice from the remaining water, and rapidly removing said ice to prevent accumulation in said vacuum chamber and introducing separately a weak brine to convey the ice and effect its removal.

4. A method of producing a circulating refrigerating medium consisting of spraying water or a water solution into a vacuum chamber, rapidly removing the vapors of evaporation to produce finely divided particles of ice in suspension, and washing the ice out of the vacuum and into the refrigerating system.

DOUGLAS KENT WARNER.